Figure 4:
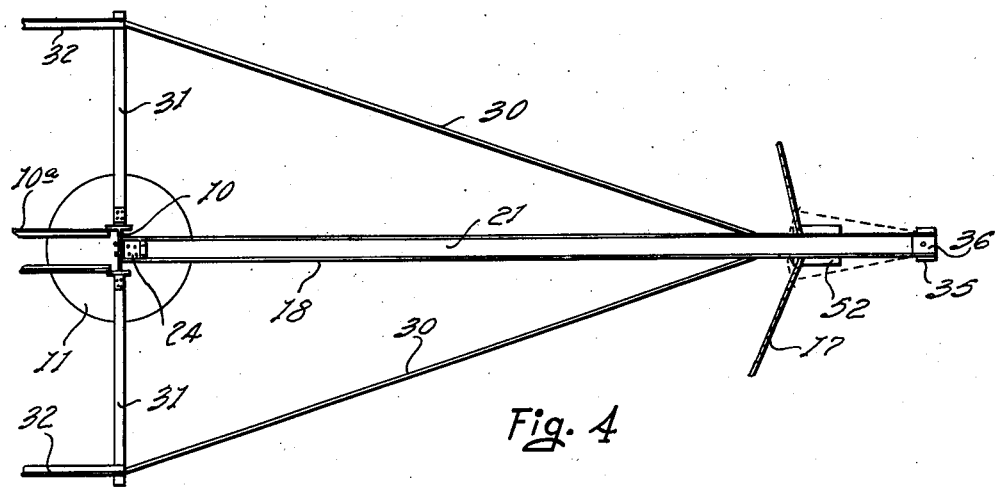

June 16, 1953
J. B. TEMPLETON
2,641,784
BRIDGE CONSTRUCTION
Filed Aug. 20, 1948
2 Sheets-Sheet 1
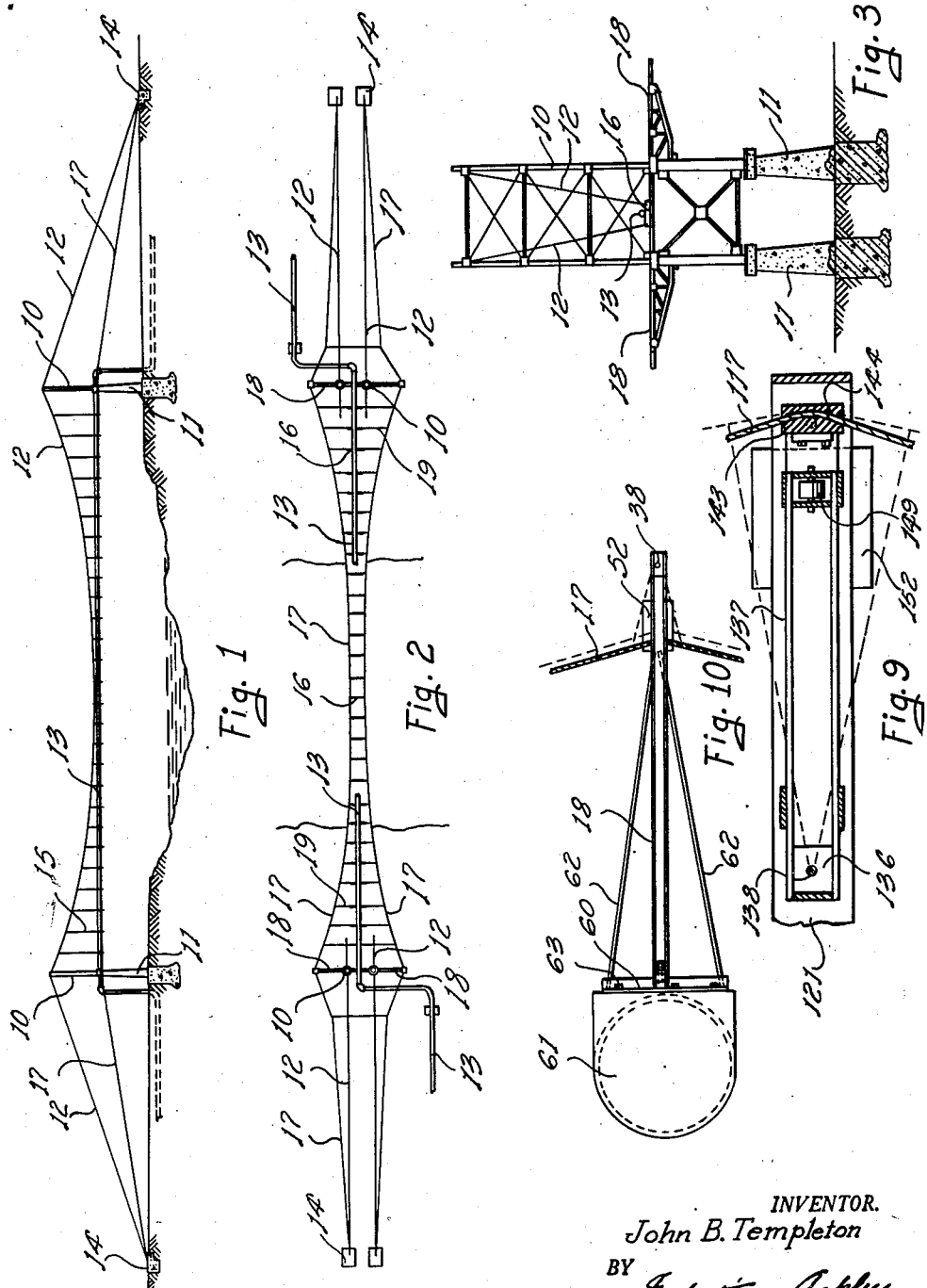
INVENTOR.
John B. Templeton
BY
ATTORNEY June 16, 1953  J. B. TEMPLETON  2,641,784
BRIDGE CONSTRUCTION Filed Aug. 20, 1948  2 Sheets-Sheet 2

INVENTOR.
John B. Templeton
BY
*Hastings Ackley*
ATTORNEY

Patented June 16, 1953

2,641,784

UNITED STATES PATENT OFFICE 2,641,784

BRIDGE CONSTRUCTION

John B. Templeton, Dallas, Tex.

Application August 20, 1948, Serial No. 45,410

16 Claims. (Cl. 14—19)

This invention relates to bridge constructions, and more particularly to suspension bridges having wind arms or trusses for supporting the wind cables, which restrain the span of the bridge against lateral movement.

The bridge construction of the invention is particularly adapted for use in suspension bridges utilized for supporting pipe lines and the like over rivers, streams and analogous formations, but is equally suitable for use with any type of suspension bridge. It is well known that, due to the lack of rigid tread structures or roadways or the like, suspension bridges which support pipe lines are more susceptible to lateral stresses or pressure produced by cross-winds and the like. However, even though the suspension bridge be formed with a substantial walkway or roadway which is somewhat rigid itself and resists such side or lateral stresses, it is frequently desirable, particularly in long spans, to provide wind cables for bracing the span against displacement by the lateral pressures or stresses imposed thereon by the cross-winds and the like.

Wind cables extending in substantially a horizontal plane parallel to the pipe line or walkway of the bridge have heretofore been supported by laterally extending trusses disposed at the towers or piers delineating the spans of the suspension bridges. Where the wind cable is rigidly secured to the outer end of the lateral truss, it has been impossible to provide for shifting of the wind cables because of the length changes resulting from temperature contraction and expansion and from the elastic stretch of the wind cable backstays under tensile stress.

It is, therefore, one object of this invention to provide in a suspension bridge construction lateral trusses for supporting wind cables at points spaced laterally from the towers or piers of the bridge and having incorporated therein means for permitting shifting or adjustment in the wind cable because of length changes resulting from temperature contraction and expansion and from the stretch of the cable backstays under tensile stress.

A particular object of the invention is to provide in a suspension bridge construction a lateral truss forming a rigid lateral brace and having a swingable wind cable supporting arm at its outer end to permit adjustment in the position of the wind cable saddle carried by said arm.

A further object of the invention is to provide a lateral wind arm truss having a swingable arm at its outer end wherein said arm may be swung laterally but is braced and confined against vertical adjustments or movements.

An important object of the invention is to provide in a wind arm truss of the character described a swingable arm which is pivoted at its outer end and swingably supports the wind cable at its inner end, whereby said swingable arm is loaded in tension.

Another object of the invention is to provide a lateral wind arm truss which is adaptable to present structures having rigid lateral wind cable supports thereon to permit installation of a movable or swingable arm to provide for movements or adjustments in the length of the wind cable supported thereby.

Still another object of the invention is to provide a lateral wind arm cable truss for suspension bridges having means for movably or swingably supporting the wind cable at a point spaced laterally from the piers or towers of the suspension bridge and wherein the wind cable will be maintained substantially effective even though the backstays of said wind cable may stretch excessively.

A still further object of the invention is to provide a lateral wind arm truss of the character described which is simple to construct and maintain.

Figure 5:
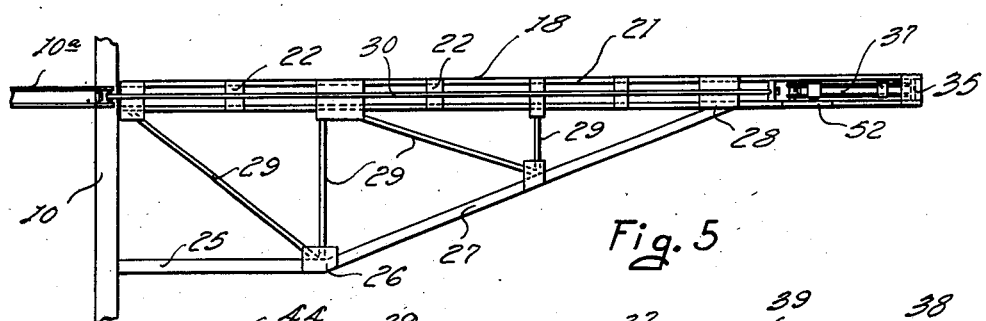
Figure 6:
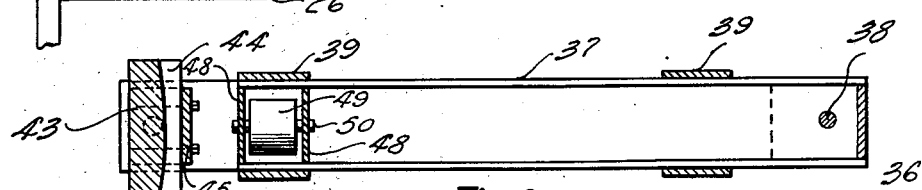
Figure 7:
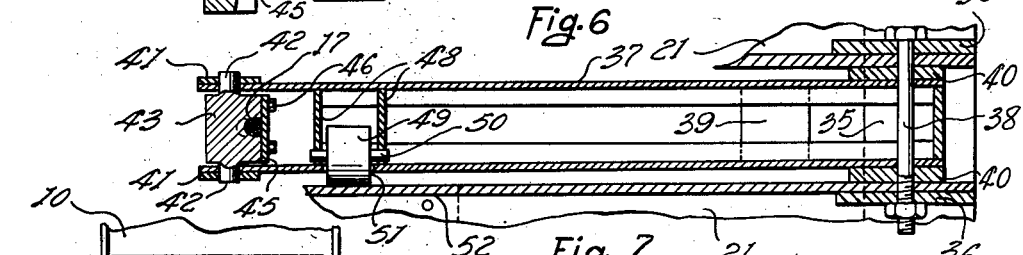
Figure 8:
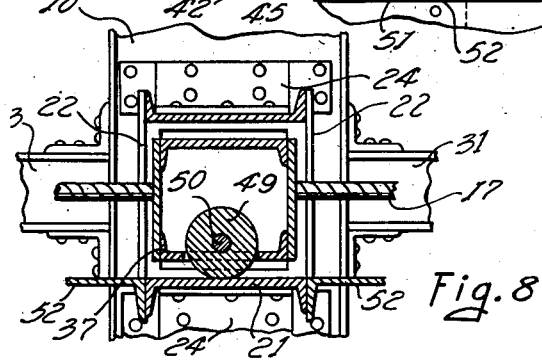

Additional objects and advantages of the invention will readily be apparent from the reading of the following description of a device constructed in accordance with the invention, and reference to the accompanying drawings thereof, wherein:

Figure 1 is a schematic side elevation, illustrating a pipe line suspension bridge having incorporated therein the wind arm trusses of the invention, Figure 2 is a plan view of the bridge of Figure 1, Figure 3 is an end elevation of one of the towers of the bridge, Figure 4 is a plan view of a lateral wind arm truss constructed in accordance with the invention, Figure 5 is a side elevation of the same, Figure 6 is a longitudinal horizontal cross-sectional view of the swingable arm of the wind arm truss, Figure 7 is a longitudinal vertical sectional view of the arm of Figure 6, Figure 8 is a transverse vertical sectional view taken through the supporting roller of the swingable arm, Figure 9 is a plan view of the outer end of a modified wind arm truss having a swingable arm mounted therein in a different manner, and Figure 10 is a plan view of a slightly modified form of mounting for the lateral wind arm truss of the invention.

In the drawings, the numeral 10 designates the main supporting towers of a suspension bridge, said towers being each supported on suitable piers 11 on opposite sides of a stream or other natural obstruction. Main supporting cables 12 extend in spaced relationship from tower to tower and are supported near the upper ends of each tower at any desired suitable height, said main cables being flexed or curved in the usual manner and extending beyond the towers to suitable ground anchors 14. Spaced vertical suspender cables 15 extend downwardly from the main cable and have suitable floor beams 16 at their lower end for supporting a pipe line 13.

For restraining the suspended pipe line against lateral displacement or sidesway, wind cables 17 are secured at the outer ends of laterally extending wind arm trusses 18 so as to be spaced from the bridge tower 10. The wind cables curve inwardly toward the pipe line in a substantially horizontal plane between the wind arm trusses, and are connected by means of horizontal stay wires 19 with the pipe supporting beams 16 at spaced points along the length of the span between the towers. The wind cables extend rearwardly from the lateral wind arm trusses 18 to the anchors 14, the portion between said trusses and anchors constituting the backstay section of the wind cable. If desired, of course, the wind cable may be secured to other anchors than the anchors for the main cables.

The piers 11 may be of any desired suitable structure, such as concrete, reinforced concrete, steel or the like. The main towers 10 of the suspension bridge may also be of any desired construction, but are shown as being steel or metallic beams having suitable cross members and stay members secured therebetween to provide a rigid structure. The floor beam for supporting the pipe line is shown as being a simple horizontal metal beam, but may be any other desired suitable structure which will carry the pipe and which may be supported from the main cables 12 of the bridge. Likewise, instead of the pipe line and the floor beam 16, the bridge may have a walkaway or roadway forming a rigid span supported by the suspension cables in the usual well-known manner. It is, therefore, believed manifest that these parts of the suspension bridge may be of any desired suitable structure other than the exact structures shown.

As clearly shown in Figures 4 and 5, the wind arm trusses 18 extend laterally from the upright of the tower 10 of the suspension bridge, each truss having an elongate upper horizontal chord formed of spaced channel members laced with steel plates 22 to form an elongate horizontal box beam 21. The box beam is positioned in horizontal alignment with the cross frame members 10a of the bridge tower, which cross frame member supports the pipe line or tread floor of the bridge. The box beam 21 is rigidly secured to the upright of the tower by angle members 24 riveted to the upright and the box beam. A lower short horizontal chord member 25 formed of an I-beam or the like has one end rigidly secured to the upright of the tower and is spaced below the box beam 21 and extends parallel thereto. The outer extremity of the lower I-beam or chord member 25 is secured by means of gusset plates 26 to an angularly disposed I-beam 27 which extends upwardly and outwardly from said lower chord member to a point on the underside of the box beam 21 spaced inwardly from the end thereof and adjacent the point of suspension of the wind cable 17. The angularly disposed I-beam is secured to the box beam by means of gusset plates 28, and angular bracing members 29 are secured at spaced points between the lower chord member and the upper chord member or box beam and between the angularly disposed I-beam 27 and the box beam to form a rigid horizontally extending truss.

The truss is held rigidly against sidesway or lateral displacement by a pair of angularly disposed tie rods 30 which are connected at their outer ends to the box beam just beyond the point of juncture of the angularly disposed I-beam 27 with said box beam and extend inwardly therefrom in a horizontal plane to brace beams 31 secured on each side of the upright of the tower 10. Tie links 32 extend from the outer ends of the brace beams 31 on each side of the tower to the brace beams on the opposite side of said tower to form a rigid structure.

It will be seen, therefore, that the box beam 21 of the wind arm truss is rigidly supported in a horizontal position extending laterally from the upright of the tower 10 of the suspension bridge structure.

At its outer end the box beam 21 is provided with side spacer plates 35, and reinforcing plates 36 are mounted on the upper and lower webs of the channels forming said box beam. An elongate swingable wind cable supporting arm 37 is pivoted within the box beam on a vertical pin 38 extending through the upper and lower webs of the box beam and through the reinforcing plates 36 carried by said beam. The swingable arm is formed in substantially the shape of a box from channel members having the flanges directed inwardly and secured in spaced relationship by side plates 39 at spaced points along the length of said arm. Reinforcing plates 40 are provided on the upper and lower surfaces of the webs of the arm for reinforcing the same at the point at which the pin 38 extends through the arm. The reinforcing plates 40 likewise serve to space the arm between the two channels forming the box beam 21 to permit the arm to swing freely therebetween.

At its inner swingable end the flanges of the channels are stripped away and the webs of the channels are provided with reinforcing plates 41 having an opening therethrough, through which the pintles or bosses 42 of a wind cable saddle 43 extend, whereby said saddle is pivotally carried on the bosses at the free swinging end of the swingable arm 37, as clearly shown in Figures 6 and 7. The wind cable 17 is secured in the saddle in an arcuate recess 44 formed therein and is held in place in said recess by a retaining plate 45 which is secured to the saddle by screws 46.

Spaced inwardly from the wind cable saddle are a pair of vertical plates 48 which extend between the webs of the channel inside the flanges thereof and provide means for rotatably supporting a roller 49 on a shaft 50 extending through the roller and through openings formed in said plates. The roller is of such a size that it projects downwardly through an opening 51 formed in the web of the lower channel of the swingable arm, and is adapted to roll on the upper surface of the lower channel of the box beam 21, as clearly shown in Figure 8. A pair of angular extension members 52 are secured to each side of the box beam at the area at which the roller engages the web of the lower channel of said box beam. The extension members form a lateral extension of the upper surface of the lower channel of said beam, whereby the roller may travel along the enlarged surface provided by said extension members 52 when the swingable arm is moved horizontally of the box beam. In effect, therefore, the lateral extension members 52 and the upper surface of the web of the lower channel of the box beam form a supporting table for the roller 49 for supporting the swingable arm 37 in its swinging movement within said box beam.

The wind cable 17 on each side of the bridge is connected at its extremities to the anchors 14 and extends through the saddle 43 in the swingable arm 37 of the wind arm truss 18 on that side of each tower and is connected by means of the horizontal stay cables 19 with the floor beams or supporting beams 16 of the bridge. The wind cables are curved inwardly from the outer extremity of the wind arm trusses toward the center of the span of the bridge in the usual manner, as illustrated in Figure 2.

From the foregoing, it will be seen that the wind arm trusses 18, which are disposed so as to extend laterally from the uprights of the towers 10 of the suspension bridge, are rigidly held in such laterally extending positions; and that the swingable arms 37 are mounted in the outer portion of the rigid truss members 18 for movably supporting the wind cable 17 at a point spaced laterally from the towers of the bridge, whereby the wind cables will restrain the pipe line 13 carried by the bridge against lateral displacement or sidesway caused by cross winds or the like. The swingable arms 37 at the outer end of the wind arm trusses permit movement of the wind cables secured thereto caused by expansion and contraction in the length of the cables resulting from temperature changes and caused by the elastic stretch of the wind cable backstays when stressed by a cross wind pressure acting on the suspended portion of the bridge. Therefore, changes in the length of the wind cable as a result of the foregoing stresses are compensated by the movement of the swingable arms 37.

Furthermore, it will be seen that the swingable arm 37 is under tensile stresses as a result of the load applied to the wind cable and will not readily be deformed thereby, and will also withstand greater loadings than would be the case if the arm were under compressive stresses. It will also be seen that the swingable arm is supported at its free end by a roller which prevents downward torque being applied to said arm by the weight of the wind cable carried thereby. The wind arm truss and swingable arm carried thereby for supporting the wind cable are simple in structure and economical to install and maintain.

Also, since the swingable arm 37 shown in Figures 4 through 8 is illustrated and described as operating under tensile stress, it is believed manifest that a flexible sling, or length of chain or the like, may be substituted for or used instead of the rigid swingable arm previously described. The invention therefore comprehends the use of any movable or swingable member under tension in the outer portion of the rigid lateral wind arm truss for movably supporting the wind cable.

It is also believed readily apparent that the swingable arm of the invention may be incorporated in the outer ends of rigid lateral trusses of suspension bridges having wind arm cables rigidly secured at their outer ends, said swingable arm when incorporated as aforesaid permitting length adjustments in the wind cables to obtain the beneficial results set forth herein.

While it is preferred that the swingable arm 37 be pivoted at its outer end on the pin 38, so that the arm carries the wind cable under tensile stress, it is possible to pivot the swingable arm at its inner end and to secure the wind cable to the outer end of said arm so that the arm supports the wind cable under compressive stress. Such an arrangement is clearly illustrated in Figure 9, wherein the reinforcing plates 136 are positioned on the box beam at a point spaced inwardly from the outer end of said box beam and the swingable arm 137 is pivoted at its inner end on a pin 138 which extends through said box beam and reinforcing plates. The wind cable 117 is secured in a saddle 143 carried at the outer free end of the swingable arm. Angular side extension members 152 are secured at the sides of the outer end of the lower channel forming the box beam 121 for supporting the arm against downward torque.

Furthermore, since the swingable arm 137 of Figure 9 in effect acts as a part of a wheel or sheave or roller, it is believed obvious that a wheel or sheave or roller may be mounted in the outer portion of the lateral rigid wind arm truss for movably supporting the wind cable instead of the swingable arm 137.

If desired, the wind arm truss may be secured to a concrete pier, rather than to the steel framework of the upright tower of the suspension bridge. In such installation, shown in Figure 10, the wind arm truss 18 is rigidly secured at its inner end to anchor plates 60 secured to the concrete pier 61. Stay rods 62 secured to the outer portion of the truss 18 extend divergently inwardly in a horizontal plane and are connected at their inner ends to horizontal beams 63 also secured to the anchor plates 60 on the pier, for holding the truss 18 against sidesway. In all other respects, the wind arm truss structure of the device illustrated in Figure 10 is the same as that of the form previously described, and the parts thereof are given the same identifying numerals as those of the form first described. Furthermore, the operation and all of the advantages of the form of the wind arm truss first described are present in this form of wind arm structure.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A bridge structure including, spaced towers, spaced main cables looped over said towers and anchored at points spaced therefrom, carrier members supported by said main cables between the towers, wind arm truss members rigidly secured at said towers and extending laterally therefrom in the plane of the carrier members, wind cables extending between the outer ends of said wind arm trusses and having stay means connecting said wind arm cables with the carrier members, and a swingable arm swingably connected at its outer end to the outer end of each wind arm truss and connected at its inner free end to the wind cable for swingably supporting the wind cables at points spaced laterally from the towers.

2. A wind arm truss for supporting a wind cable of a suspension bridge including, an elongate rigid truss frame adapted to be rigidly secured at the side of a tower of the bridge, a swingable supporting arm pivoted at one end on the outer portion of the truss frame, said pivot being spaced inwardly from the outer end of the truss and the free end of said arm being supported against downward deflection by a surface on the truss, and a wind cable saddle carried at the full end of the swingable arm for supporting a wind cable of the bridge.

3. A wind cable supporting arm for supporting a wind cable of a suspension bridge including an elongate cantilever truss member adapted to be rigidly secured at the side of a tower of the bridge, a swingable supporting arm pivoted at its outer end to the outer end of the cantilever truss, and a wind cable saddle pivotally carried at the inner end of the swingable arm and having means for securing a wind cable of the bridge in said saddle.

4. In a suspension bridge structure, a wind arm truss for supporting a wind cable of said bridge structure and including, an elongate cantilever truss member rigidly secured at one side of a tower of the bridge, a swingable supporting arm pivoted at its inner end at the outer portion of said cantilever truss member, means on the truss supporting the outer end of the arm against downward deflection, and a wind cable saddle pivotally carried at the outer end of the swingable arm and having means for securing said wind cable thereto, said swingable arm permitting said wind cable to move to accommodate length changes in said cable.

5. A suspension bridge structure including, spaced towers, spaced main cables supported by said towers and anchored at points spaced therefrom, carrier members supported by said main cables between the towers, a cantilever wind arm truss member rigidly secured at each side of each tower and extending laterally therefrom, a swingable arm swingably mounted at its outer end at the outer end of each wind arm truss and disposed substantially in the plane of the carrier members, and a wind cable on each side of said bridge secured to the inner swingable end of the swingable arm of each wind truss member and extending therebetween arcuately in a horizontal plane toward the carrier members of the bridge and anchored at its ends at points spaced from the wind arm trusses, said swingable arms of the wind arm truss members permitting the wind cable to move to accommodate length changes in said cable.

6. In a suspension bridge structure of the character set forth in claim 5, stay means between the wind arm trusses connecting the wind cables with the carrier members whereby the wind cables restrain the carrier members against lateral movement.

7. A wind arm truss for supporting a wind cable of a suspension bridge and including, an elongate cantilever truss frame adapted to be rigidly secured at a side of a tower of the bridge, said truss frame having a horizontal opening formed therein at its outer end, a swingable supporting arm pivoted at its outer end in the opening at the outer end of the truss frame, a wind cable saddle pivotally secured at the inner end of the swingable arm and having means for securing a wind cable thereto, a roller carried at the swingable end of the swingable supporting arm for supporting the arm against downward deflection, said roller engaging the lower portion of the wind arm truss at the opening therein to support the swingable arm.

8. In a wind arm truss of the character set forth in claim 7, extension members on each side of the wind arm truss at the lower side of the opening formed therein for providing an enlarged supporting surface for the roller of the swingable arm.

9. A wind arm truss for supporting a wind cable of a suspension bridge including, an elongate rigid cantilever truss frame adapted to be rigidly secured at the side of a tower of the bridge and to extend laterally therefrom, said truss frame including an upper box beam having an elongate horizontal opening at its outer end, a lower beam spaced from the upper box beam at its inner end and connected at its outer end with the box beam at a point spaced inwardly from the opening therein, intermediate braces joining the box beam and the lower beam to provide a rigid truss, side brace members connected with the box beam at a point spaced inwardly from the opening in said box beam and extending divergently inwardly in a horizontal plane to be connected at their inner ends at the bridge tower for preventing lateral movement of the truss frame, a swingable supporting arm pivoted at one end in the opening at the outer end of the box beam, a wind cable saddle pivotally mounted at the other end of the swingable arm for supporting the wind cable of the bridge, and a roller rotatably mounted at the free swingable end of the swingable arm and engaging the lower portion of the box beam in the opening formed therein for supporting the swingable arm against downward deflection.

10. A wind arm truss of the character set forth in claim 9 wherein, the swingable supporting arm is pivotally secured at its outer end at the outer end of the box beam opening and the wind cable saddle and roller are mounted at the inner end of said swingable arm, whereby the wind cable supported by the arm exerts a tensile stress upon said arm.

11. A wind arm for supporting a lateral wind cable of a suspension bridge and including, an elongate rigid truss adapted to be rigidly secured at the side of a tower of the bridge and project laterally therefrom, a movable supporting member connected at its outer end to the outer portion of said truss, and means for connecting a lateral wind cable of the bridge with the inner movable end of said movable supporting member whereby the movable member may support the wind cable under tensile stress and permit movement of the wind cable to accommodate changes in length or position of said cable.

12. A wind arm truss of the character set forth in claim 9 wherein, the swingable supporting arm is pivotally secured at its inner end at the inner end of the box beam opening and the wind cable saddle and roller are mounted at the outer end of said swingable arm.

13. A wind arm truss for supporting a wind cable of a suspension bridge and including, an elongate cantilever truss frame adapted to be rigidly secured at a side of a tower of the bridge, said truss frame having a horizontal opening formed therein at its outer end, a swingable supporting arm pivoted at its inner end in the opening at the outer end of the truss frame, a wind cable saddle pivotally secured at the outer end of the swingable arm and having means for securing a wind cable thereto, a bearing carried at the swingable end of the swingable supporting arm engaging a surface of the wind arm truss to support the swingable arm against downward deflection.

14. In a suspension bridge structure, a wind arm truss for supporting a wind cable and including, an elongate cantilever truss member adapted to be rigidly secured at one side of a tower of the bridge, a swingable supporting arm pivoted at its inner end at the outer portion of said cantilever truss member, a bearing carried by the outer swingable end of the supporting arm, a horizontal supporting surface carried by the truss member and engageable by the bearing for supporting the swingable arm against downward deflection, and a connecting member carried by the outer end of the swingable supporting arm for connecting a wind cable thereto.

15. A bridge structure including: spaced towers; a supported structure interposed between said towers; arms rigidly secured to said towers and extending laterally therefrom; wind cables extending between the outer ends of said rigid arms; connections between the wind cables and the supported structure; a plurality of swingable arms, each of said swingable arms being swingably connected at one end to the outer end of a rigid arm and connected at its free end to a wind cable for swingably supporting the wind cables at points spaced laterally from the towers, said swingable arms being swingable horizontally about vertical axes spaced laterally from the towers; each of said rigid arms having a horizontal supporting surface; and a bearing mounted on each swingable arm and contacting said horizontal surface to prevent downward deflection of said swingable arm.

16. A bridge structure including: spaced towers; a supported structure interposed between said towers; arms rigidly secured to said towers and extending laterally therefrom; wind cables extending between the outer ends of said rigid arms; connections between the wind cables and the supported structure; and a plurality of swingable arms, each of said swingable arms being swingably connected at its outer end to the outer end of a rigid arm and connected at its free inner end to one of said wind cables for swingably supporting the wind cables at points spaced laterally from the towers, said swingable arms being swingable horizontally about vertical axes spaced laterally from the towers, each of said rigid arms supporting its associated swingable arm against downward deflection.

JOHN B. TEMPLETON.

References Cited in the file of this patent

UNITED STATES PATENTS

| Number | Name | Date |
|---|---|---|
| 2,221,919 | Kenan | Nov. 19, 1940 |